United States Patent
Franz

(10) Patent No.: US 11,752,993 B2
(45) Date of Patent: Sep. 12, 2023

(54) SPRING BRAKE, BRAKE SYSTEM, AND MOTOR VEHICLE

(71) Applicant: ZF CV Systems Europe BV, Brussels (BE)

(72) Inventor: Janusz Franz, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 57 days.

(21) Appl. No.: 17/602,209

(22) PCT Filed: Apr. 8, 2019

(86) PCT No.: PCT/EP2019/058738
§ 371 (c)(1),
(2) Date: Oct. 7, 2021

(87) PCT Pub. No.: WO2020/207551
PCT Pub. Date: Oct. 15, 2020

(65) Prior Publication Data
US 2022/0194348 A1   Jun. 23, 2022

(51) Int. Cl.
*B60T 17/08* (2006.01)
*B60T 17/00* (2006.01)
*F16D 66/00* (2006.01)

(52) U.S. Cl.
CPC ...... *B60T 17/086* (2013.01); *F16D 2066/003* (2013.01)

(58) Field of Classification Search
CPC .................................................. B60T 17/086
See application file for complete search history.

(56) References Cited

U.S. PATENT DOCUMENTS

| 5,632,192 | A | 5/1997 | Plantan |
| 5,636,562 | A | 6/1997 | Choinski |
| 5,943,940 | A | 8/1999 | Angerfors |
| 2004/0060784 | A1* | 4/2004 | Gravier ............... B60T 17/086 188/170 |

FOREIGN PATENT DOCUMENTS

| DE | 102007041769 A1 | | 3/2009 | |
| JP | 2008151213 A | * | 7/2008 | |
| WO | 9707322 A1 | | 2/1997 | |
| WO | WO-9720153 A1 | * | 6/1997 | ........... B60T 17/085 |
| WO | 0244004 A1 | | 6/2002 | |
| WO | WO-2008027020 A1 | * | 3/2008 | ........... B60T 17/085 |

* cited by examiner

*Primary Examiner* — Melody M Burch
(74) *Attorney, Agent, or Firm* — Dickinson Wright PLLC

(57) ABSTRACT

A spring brake cylinder (100) for a brake system (800) of a motor vehicle (1000) includes a brake release mechanism (110), configured to axially contract a brake spring chamber (112) against a brake spring force in a release direction (RD) from a parking position (PP) to a driving position (PD). A brake state indicator (120) includes an actuation element (128) axially held in a force equilibrium (EF) between an actuation spring (124), exerting an actuation force (FA) on the actuation element (128), and a return spring (126), exerting a return force (FR) on the actuation element (128). The actuation force (FA) is altered by nut motion (MN) of a running nut (122), caused by rotational motion of a release screw (132) to shift the force equilibrium (FE), resulting in an axial movement (ME) of an actuation element (128) operatively coupled to an indicator pin (134) of the brake state indicator (120).

16 Claims, 4 Drawing Sheets

SPRING BRAKE, BRAKE SYSTEM, AND MOTOR VEHICLE

CROSS-REFERENCE TO RELATED APPLICATIONS

This application is a 371 National Stage Application that claims priority to International Application No. PCT/EP2019/058738, filed Apr. 8, 2019, which is hereby incorporated by reference in its entirety.

FIELD

The invention relates to a spring brake cylinder, in particular a parking brake cylinder, for a brake system of a motor vehicle, having a brake release mechanism configured to axially contract a brake spring chamber against a brake spring force in a release direction from a parking position to a driving position.

BACKGROUND

Spring brake cylinders, in particular those of the type with a release mechanism for releasing the braking function during an emergency or parking brake state, are generally known.

Indicator devices for indicating the brake state of a spring brake cylinder with a release mechanism, configured for indicating whether a spring brake cylinder is in a braking state or in a released state, have generally proven advantageous.

For example, U.S. Pat. No. 5,636,562 describes a brake release tool that incorporates a two-part structure wherein a portion that is accessible from outside the brake actuator does not move axially away from the brake actuator during caging (compression) with an outer bolt, which turns a threaded inner nut, which again moves axially to contact a piston, and moves the piston to cage (compress) the power spring, wherein the bolt need not move axially outwardly, although in one embodiment it may move slightly axially inwardly as the spring is caged (compressed) to provide a visual indication that the spring is not uncaged (uncompressed).

DE 10 2007 041 769 A1 describes a spring brake cylinder for commercial vehicles which includes at least one spring brake piston that can be actuated by a pre-loaded spring and is supported in a housing, wherein a mechanical emergency release device is provided for the emergency release of the spring brake cylinder and the emergency release device includes an indicator that has an indicator rod indicating the position of the spring brake piston. The indicator rod extends through a threaded spindle of the emergency release device and is movable in the axial direction and a stop body is disposed in the region of one end of the indicator rod, wherein the stop body is positively connected to the indicator rod by a detent connection produced by an axial relative movement between the indicator rod and the stop body. Therefore, the spring brake cylinder presented in DE 10 2007 041 769 A1 comprises an indicator which is integrated into a longitudinal through-bore of the spindle of the emergency release device.

However, the manufacturing of a spring brake cylinder with a brake state indicating capability and in particular its assembly still involves relatively high effort and costs. Also, the indication of the current state of the brake, in particular a good visibility of a brake state indicator, still can be improved.

It is therefore desirable to address at least one of the above problems. Spring brake cylinders should be improved with respect to costs, manufacturing effort and functionality. In particular, the spring brake cylinders ability of indicating the current state of the brake should be improved.

SUMMARY

It is therefore an object of the invention to provide an improved mechanism of brake state indication while reducing the manufacturing effort and costs of the spring brake cylinder.

In accordance with the invention, a spring brake cylinder is provided including: a brake release mechanism, configured to axially contract a brake spring chamber, against a brake spring force, in a release direction DR from a parking position to a driving position. The brake release mechanism includes: a release screw with an external thread, and a running nut, configured to act against the brake spring chamber, with an internal thread movably engaged with the external thread, such that a rotational motion of the release screw results in an axial nut movement of the running nut. The spring brake cylinder also includes a brake state indicator, including a moveably arranged indicator pin, configured to indicate at an external surface a brake state. The brake state indicator includes an actuation element, wherein the actuation element is axially held in a force equilibrium between an actuation spring, exerting an actuation force on the actuation element, and a return spring, exerting a return force on the actuation element. The actuation force is altered by the nut movement of the running nut so as to shift the force equilibrium, resulting in an axial element movement of the actuation element of the brake state indicator. The actuation element is operatively coupled to the indicator pin so as to transfer the element movement to the indicator pin.

The invention is based on a spring brake cylinder, in particular a parking brake cylinder, for a brake system of a motor vehicle, having a brake release mechanism, configured to axially contract a brake spring chamber against a brake spring force in a release direction from a parking position to a driving position, wherein the brake release mechanism comprises a release screw with an external thread and a running nut, configured to act against the brake spring chamber, with an internal thread movably engaging to the external thread, such that a rotational motion of the release screw results in an axial nut movement of the running nut, and a brake state indicator, having a moveably arranged indicator pin, configured to indicate a brake state at an external surface of the spring brake cylinder.

According to the invention, in one aspect, the spring brake cylinder includes the brake state indicator that comprises an actuation element, wherein the actuation element is axially held in a force equilibrium between an actuation spring, exerting an actuation force on the actuation element, and a return spring, exerting a return force on the actuation element, wherein the actuation force is, altered by the nut motion of the running nut so as to shift the force equilibrium, resulting in an axial actuation element movement of the actuation element, and the actuation element is operatively coupled to the indicator pin so as to transfer the actuation element movement to the indicator pin.

The invention includes the finding that an indication mechanism for indicating the brake state is generally advantageous. The invention further includes the finding that it is also advantageous if said indicating means requires only a small amount of space or no extra space, and in particular does not significantly extend outside of the spring brake cylinder, since normally strict space constraints apply for brake systems in mobile motor vehicles.

According to the invention, it was specifically recognized that, although some other approaches exist that provide an indication mechanism with reduced space requirements, these approaches still involve a relatively high effort of manufacturing and/or assembly, in particular involving the manufacturing of a relatively long and precise longitudinal through bore through a threaded release screw of a release mechanism.

According to an aspect of the present disclosure, by comprising an actuation element, which is configured to axially move the indicator pin, and which is axially held in a force equilibrium between an actuation spring and a return spring, the actuation element is moved dependent on the currently existing force equilibrium.

Furthermore, because the actuation force is altered by the nut motion of the running nut so as to shift the force equilibrium, resulting in an axial element movement of the actuation element, the force equilibrium and consequently, the actual position of the actuation element, represents the currently existing position of the running nut and therefore, the currently existing brake state of the spring brake cylinder, in particular of the brake release mechanism.

Furthermore, because the actuation element is operatively coupled to the indicator pin so as to transfer the actuation element movement to the indicator pin, the indicator pin represents the currently existing position of the actuation element, and consequently the currently existing brake state of the spring brake cylinder, in particular of the brake release mechanism. In particular, the indicator pin is configured to indicate the brake state of the spring brake cylinder by travelling between a hidden, parking signaling state and an extended, driving signaling state.

With a spring brake cylinder according to the aspects of the invention, a brake state indicator is provided that allows for reliable indication of the current brake state, in particular of the current state of the brake release mechanism. This is particularly advantageous in contrast to other approaches in the state of the art, which merely indicate the brake state e.g. by a shifted axial position of the release screw, which is more likely to be overlooked.

Furthermore, the manufacturing and assembly effort of a spring brake cylinder according to the concept of the invention is relatively low, as the indication mechanism, that is the brake state indicator, in particular relies on components that are circumferentially arranged in a relatively thin space around the release screw and therefore—despite its compact and integrated design—does not require any additional complex manufacturing steps such as drilling an longitudinal through hole through the release screw. Because the space used by the brake, state indicator around the release screw, in particular by the actuation element, the actuation spring, and the return spring, is relatively thin, more space is available for other components inside the spring brake cylinder, or the spring brake cylinder can be designed smaller. The components of the brake state indicator can particularly be arranged onto the release screw as a relatively simple preassembly step and then inserted together into the spring brake cylinder through a release screw passage.

Further embodiments of the invention can be found throughout the disclosure and show particular advantageous possibilities to realize the above described concept in light of the object of the invention and regarding further advantages.

In accordance with a further embodiment, in one aspect the indicator pin is fixed to the actuation element. With a fixed connection between the indicator pin and the actuation element, actuation element movement of the actuation element is reliably transferred to the indicator pin for back and forth axial movements, that is axial movements in the release direction as well as in the braking direction.

In accordance with a further embodiment, in one aspect a pin passage axially extends through a portion of the release screw, in particular through a release screw head of the release screw, with a radial offset relative to a center axis of the release screw. Such embodiment provides for a compact accommodation of the indicator pin. The appearance of the indicator pin closely resembles that of a conventional brake state indicator, but instead of being coaxially aligned with the release screw, the indicator pin is arranged parallel, but offset to the center axis of the release screw. By being operatively coupled to an actuation element of a brake state indicator which is principally arranged in the relatively thin circumferential zone outside the release screw, the indicator pin can advantageously be accommodated in said offset pin passage. In contrast to a longitudinal through bore, said pin passage only runs through the release screw head, and is therefore significantly easier to manufacture.

In accordance with a further embodiment, in one aspect the spring brake cylinder further includes a bushing, arranged in the radial gap space between a cylinder lid and the release screw. Such bushing facilitates the assembly and disassembly of the brake release mechanism, in particular the release screw, through the cylinder lid, and also advantageously enables a relative rotational motion between the cylinder lid, on the outer radial side, and the release screw together with the brake state indicator, on the inner radial side.

In accordance with a further embodiment, in one aspect the brake state indicator is rotatable within the bushing. In such embodiment, the components of the brake state indicator, in particular the return spring, can suitably rotate within the bushing. For such purpose, the bushing can be made of or coated with a suitable, low friction material such as PTFE or another suitable plastic or ceramic or metal material.

In accordance with a further embodiment, in one aspect the release screw includes an integrally attached tool fitting, accessible from an external surface of the spring brake cylinder. With the tool fitting, a corresponding tool can be engaged to the release screw head in order to turn the release screw. For example, the tool fitting can be a hexagonal screw head, or an Allen key type screw head.

In accordance with a further embodiment, in one aspect the indicator pin is configured to be moved by the actuation element from a hidden, parking signaling state, when the brake spring chamber is in a parking position, to an extended, driving signaling state, when the brake spring chamber is in a driving position. In this embodiment, the currently existing brake state of the brake actuator and in particular the spring brake cylinder is dearly visible from the outside, which is visible from an external surface of the spring brake cylinder. In preferred embodiments, the indicator, pin extends 5 mm outside of the release screw head when in driving signaling state.

The invention also provides a brake system for a motor vehicle with at least one brake unit, wherein the at least one brake unit comprises a brake actuator with a spring brake cylinder according to the concept of the invention.

The invention also provides a motor vehicle, comprising a brake system with a spring brake cylinder according to the concept of the invention.

The advantages of the spring brake cylinder according to the invention are also advantageous for the brake system and ultimately, for the motor vehicle in which the brake system is applied. In particular, the lower space requirements of the spring brake cylinder as well as the lower required manufacturing effort are particularly advantageous for an application in a vehicle, where space, weight and cost considerations are important design factors.

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects.

BRIEF DESCRIPTION OF THE DRAWINGS

The above description and other aspects, features and/or technical effect will be apparent from and elucidated with reference to the illustrations described hereinafter wherein.

DETAILED DESCRIPTION OF THE DRAWINGS

Figure 1:
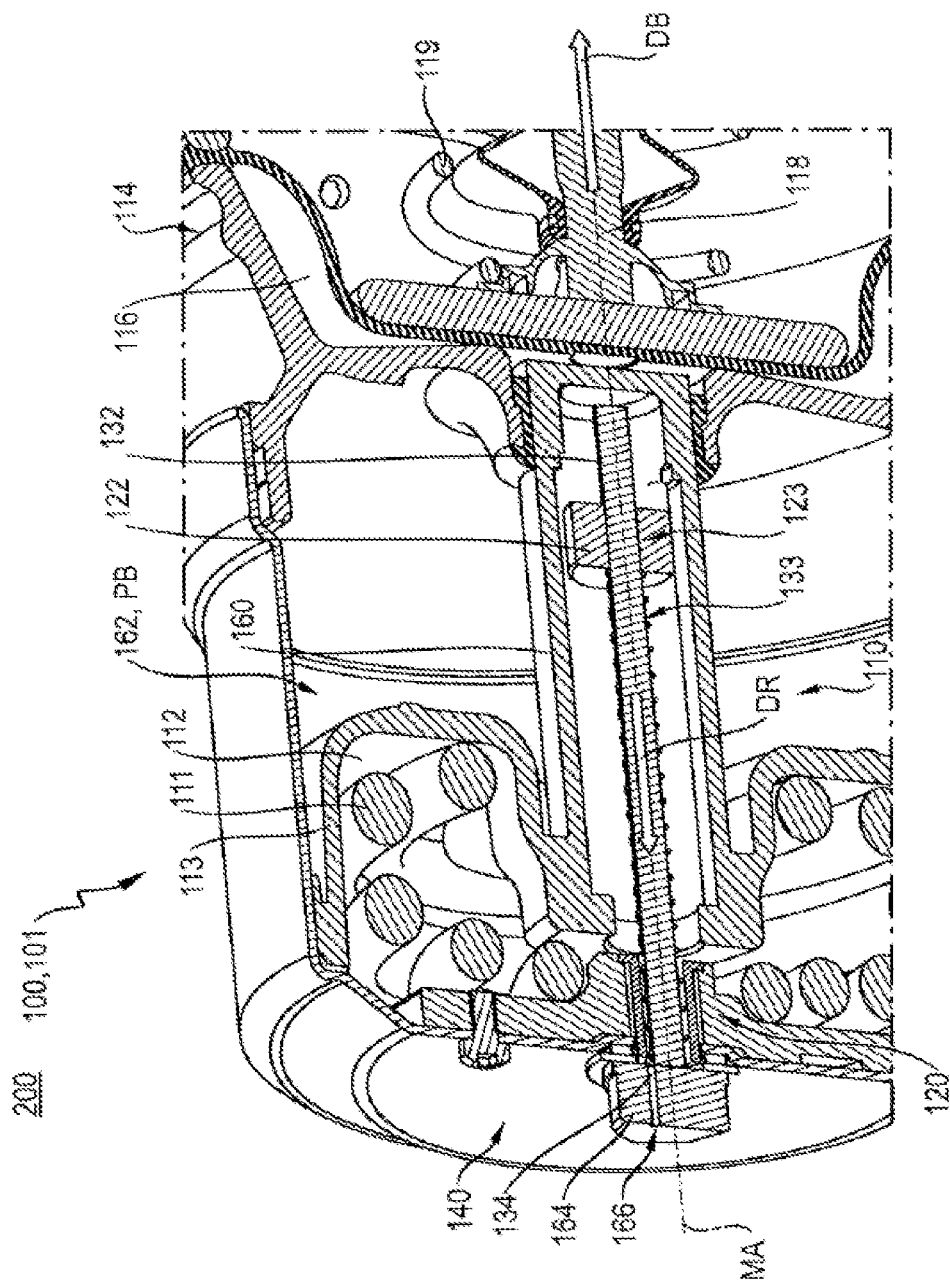
FIG. 1 is a partial perspective cross-sectional view of a brake actuator with a spring brake cylinder according to an aspect of the invention.

FIG. 1 shows a partial perspective cross-sectional view a brake actuator 200 for a motor vehicle 1000 (not shown in FIG. 1) with a spring brake cylinder 100 according to the concept of the invention. The brake actuator 200 includes a service brake cylinder 114 and a spring brake cylinder 100, in the form of a parking brake cylinder 101, whereas the service brake cylinder 114 and the spring brake cylinder 100 are both coaxially aligned, along a main axis A.

The service brake cylinder 114 includes a service braking piston 118 which, by way of a service brake spring 119 and a service brake chamber 116, can be moved axially along the main axis MA during the operation of the motor vehicle 1000. By selectively increasing a service brake pressure PS (not shown in FIG. 1) inside the service braking chamber 116, the service brake piston 118 can be moved against the force of the service brake spring 119 in a braking direction DB in order to perform a braking function.

The spring brake cylinder 100 includes a brake chamber 162 and a brake spring chamber 112, which is located inside an elastic chamber bellow 113 and includes a brake spring 111. The chamber bellow 113 flexibly separates the brake spring chamber 112 from the brake chamber 162. By selectively increasing a braking pressure PB inside the brake chamber 162, the flexible volume of the brake spring chamber 112 is compressed against the force of the brake spring 111 such that the axial dimension of the brake spring chamber 112 is decreased. When the braking pressure PB is decreased, the brake spring 111 will expand, consequently leading to the expanding of the brake spring chamber 112 and the chamber bellow 113, which again results in an axial movement of a brake piston 160 in the braking direction DB. The brake piston 160 is operatively coupled to the service brake piston 118 such that it pushes the service brake piston 118 in the braking direction DB when moved in the braking direction DB. That way, the braking function of the brake system 200 can be fulfilled by the spring brake cylinder 100, in particular independent of the service brake cylinder 114.

The described function of the spring brake cylinder 100 ensures that, in the case that pressurized air is not available for increasing the braking pressure PB, the brake spring 111 will expand, which will lead to an axial movement of the brake piston 160 and consequently, the service brake piston 118 into the braking direction DB, resulting in a vehicle braking condition VBC of the motor vehicle 1000.

Aside from parking, the capability to switch into the vehicle braking condition VBC (not shown in FIG. 1) is particularly a safety feature of a vehicle, because in the case of pressurized air not being available, in particular because of the failure of the pressurized air supply, the service brake cylinder 114 most likely will also not be available, which would severely impair the vehicle's braking capability. In this case, the braking movement of the brake spring 111 and ultimately of the service brake piston 118 will ensure that the motor vehicle 1000 will come to a stop and therefore significantly decrease the risk of the vehicle or any persons getting harmed.

However, in this vehicle braking condition VBC of the brake actuator 200, which in particular can occur during an emergency or parking situation when no pressurized air is available, the motor vehicle 1000 cannot be moved. In order to overcome this vehicle braking condition VBC, the spring brake cylinder 200 further includes a brake release mechanism 110. The brake release mechanism 110 includes a release screw 132 and a running nut 122, wherein both are coaxially aligned along the main axis MA and are configured to compress the chamber bellow 113 and consequently, the brake spring chamber 112. For this, the release screw 132 includes an external thread 133, which engages an internal thread 123 of the running nut 122. The release screw 132 further includes a release screw head 164, which is located at an external surface 140 of the spring brake cylinder 100 and protrudes from the spring brake cylinder 100 to the outside of the spring brake cylinder 100, opposite of the service brake cylinder 114. By turning the cylinder screw head 164, the engaging threads 123, 133 will result in an axial nut movement MN (FIG. 2A) of the running nut 122, in particular in a release a direction DR (FIG. 2A) which is opposite to the braking direction DB, wherein the axial nut movement MN moves the running nut 122, and thus the brake spring chamber 112, from a parking position PP (FIG. 2A) to a driving position PD (shown in FIG. 2A). In principle, the axial movement of the running nut 122 has a similar effect as increasing the braking pressure PB in the brake chamber 116, namely contracting the brake spring chamber 112 by axially compressing the chamber bellow 113, as well as axially moving the brake piston 160 in the release direction DR. Such axial movement of the brake piston 150 in the release direction DR will consequently result in an axial movement of the service brake piston 118 also in the release direction DR. As a consequence, the braking function of the brake actuator 200 will be released and consequently, at least if a certain degree of axial movement of the service brake piston 118 in the release direction DR is overcome, the brake actuator 200 will change from the vehicle braking condition VBC to a vehicle driving condition VDC.

According to the concept of the invention, the spring brake cylinder 100 further comprises a brake state indicator 120. Said brake state indicator 120 is configured to indicate whether the brake actuator 200, in particular the spring brake cylinder 100, is in a vehicle braking condition VBC or in a vehicle driving condition VOC.

Figure 2B:
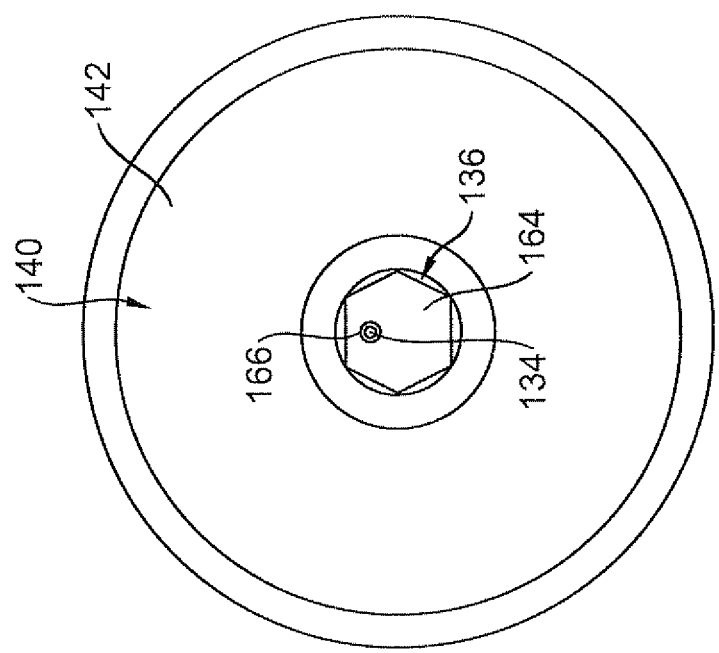
FIG. 2B is an end view of an aspect of the spring brake cylinder.
Figure 2A:
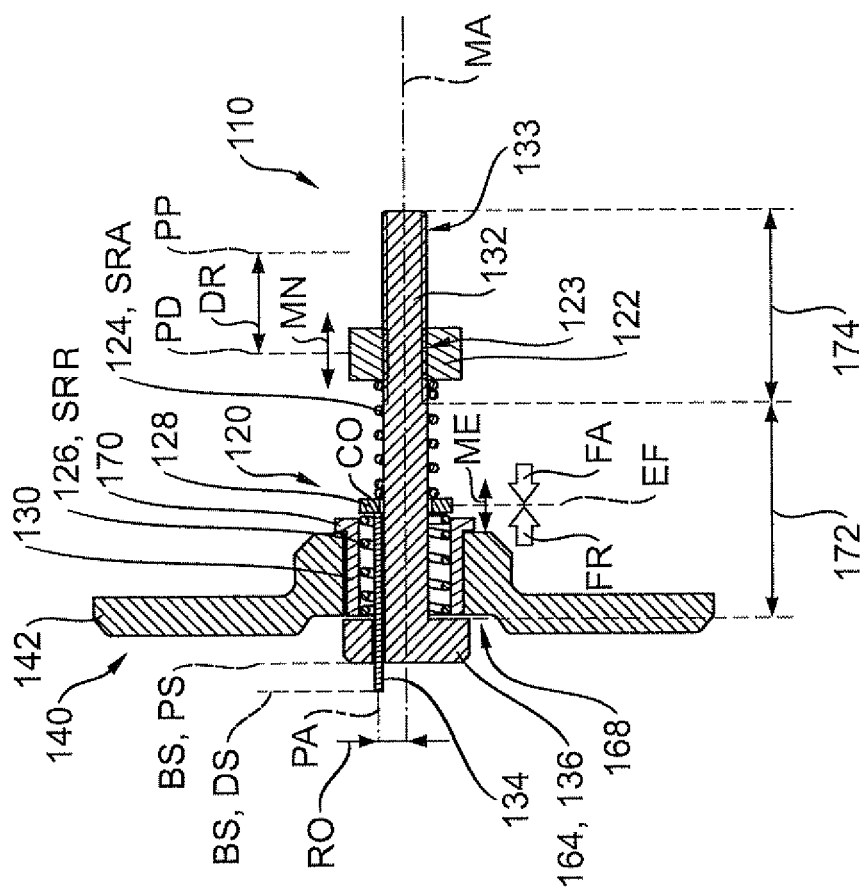
FIG. 2A is a cross-sectional side view of an aspect of the spring brake cylinder.

Turning now to FIG. 2A, it can be seen that the brake state indicator 120 includes an indicator pin 134, which is housed in an axially movable manner in a pin passage 166 (shown in FIG. 2B) inside the release screw 132, in particular inside the release screw head 164. The pin passage 166 is arranged along a pin axis PA parallel to the main axis MA, but with a radial offset RO relative to the main axis MA. The release screw 132 is inserted into a cylinder lid 142 of the spring brake cylinder 100 through a release screw passage 168. In the radial gap of the release screw passage 168 between the cylinder lid 142 and the release screw 132, a bushing 130 is inserted from the inside (in release direction DR), wherein the inserting motion is stopped by an annular stop 170 of the bushing 130. The release screw head 164 comprises an integrated tool fitting 136, here in form of a hexagonal screw head.

The brake state indicator 120 further comprises an actuation element 128, which here has the form of an annular disk fitting around a shaft portion 172 of the release screw 132 in an axially movable manner, wherein the actuation element 128 is held in an axial force equilibrium EF between an actuation spring 124 and a return spring 126. The actuation spring 124 radially fits around the release screw 132 and is axially held between the actuation element 128 and the running nut 122. Due to the compression of the actuation spring 124, an axial actuation force FA is exerted onto the actuation element 128 in the release direction DR. On the opposite side of the actuation element 128, a return force FR is exerted by the return spring 126, wherein the return spring 126 is axially held between the release screw head 164 and the actuation element 128 in a radial space between the release screw 132 and the bushing 130. In some embodiments, both the actuation spring 124 and the return spring 126 can be compression springs. In other embodiments, both the actuation spring 124 and the return spring 126 can be tension springs. Because of the engaging threads 123, 133, the running nut 122 can be axially moved, in particular in the release direction DR by turning the screw head 164 clockwise, e.g. with a wrench (wrench not shown here) in, order to release the vehicle braking condition VBC of the spring actuator 200. When the running nut 122 is moved in a nut movement MN in the release direction DR, the axial distance between the actuation element 128 and the running nut 122 decreases, leading to an increase of the actuation force FA. In this case, the actuation element 128 is axially shifted in an actuation element movement ME in the release direction DR until the force equilibrium EF is reestablished, that is until the value of the actuation force FA is equal to the oppositely directed return force FR again.

The actuation element 128 is operatively coupled in an operative coupling CO to the indicator pin 134. The operative coupling CO ensures that the indicator pin 134 axially moves along with the actuation element 128 back and forth.

The actuation element 128 can be welded or glued to the indicator pin 134, or the indicator pin 134 can be fixedly inserted into a pinhole of the actuation element 128. Further, the indicator pin 134 and the actuation element 128 can be integrally formed as one part, for example as an integrally molded plastic piece. When the actuation element 128 is axially shifted in the release direction DR, the indicator pin 134 is also moved in the release direction DR, since the actuation element movement ME is transferred from the actuation element 128 to the indicator pin 134 through the operative coupling CO.

An actuation spring rate SRA of the actuation spring 124 as well as a return spring rate SRR of the return spring 126 can be influenced by several factors, in particular the material of the spring, the number of windings, and the wire diameter.

The actuation spring rate SRA and the return spring rate SRR are configured relatively to each other, in particular in that the indicator pin 134 will remain in a parking signaling state PS, hidden within the release screw head 164, when the running nut 122 is in the parking position PP in an according brake state BS. Consequently, the indicator pin 134 will extend into a driving signaling state DS, protruded outside of the release screw head 164, when the running nut 122 is in the driving position PD in an according, different brake state BS. In the driving signaling state DS, the indicator pin 134, preferably of red color, or another highly signaling color, can clearly be seen at the external surface 140 by a user, in particular by the user operating the wrench and opening the release screw 132. The axial distance between the parking signaling state PS and the driving signaling stayed DS of the indicator pin 134 preferably amounts to maximally 5 mm. This means, that the indicator pin 134 preferably extends out of the release screw head 164 fora maximum length of 5 mm. Through this indication of the driving signaling state DS, the user can affirm that the brake actuator 200 has been released and the moving capability of the motor vehicle 1000 has (at least partially) been restored. If the motor vehicle 1000 includes a multitude of brake actuators 200 (which is the normal case), all brake actuators 200 have to be released accordingly before the motor vehicle 1000 can be moved.

When the brake release mechanism 110 is applied in the opposite direction, the running nut 122 travels from the driving position PD back to the parking position PP, and the indicator pin 134 hides again in the pin passage 166.

FIG. 2B shows a front view or end view of the embodiment that is shown in FIG. 2A. The external surface 140 of the spring brake cylinder 100, in particular of the cylinder lid 142 can be seen. Also, the release screw head 164 with a tool fitting 136 in the form of a hexagonal screw head is visible. The pin passage 166 runs through the release screw head 164 and exits visibly at the outside at the external surface 140, accommodating the indicator pin 134.

Figure 3B:
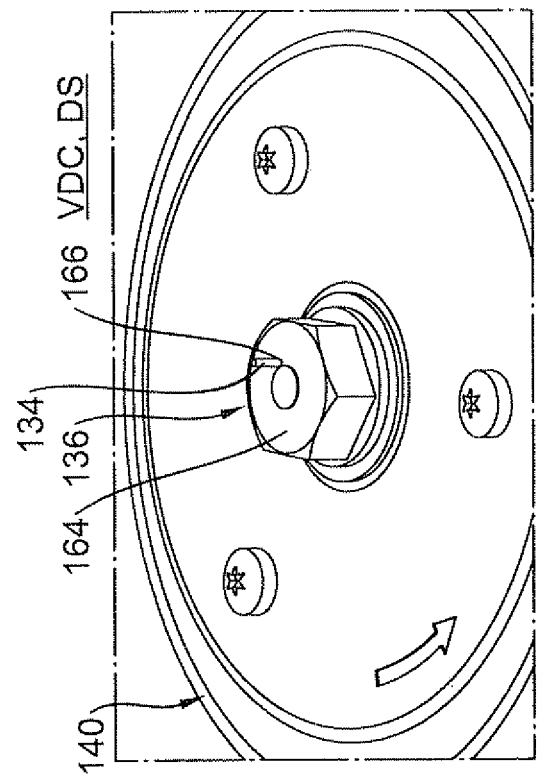
FIG. 3B is a partial perspective view of the external surface of the spring brake cylinder in another brake state.
Figure 3A:
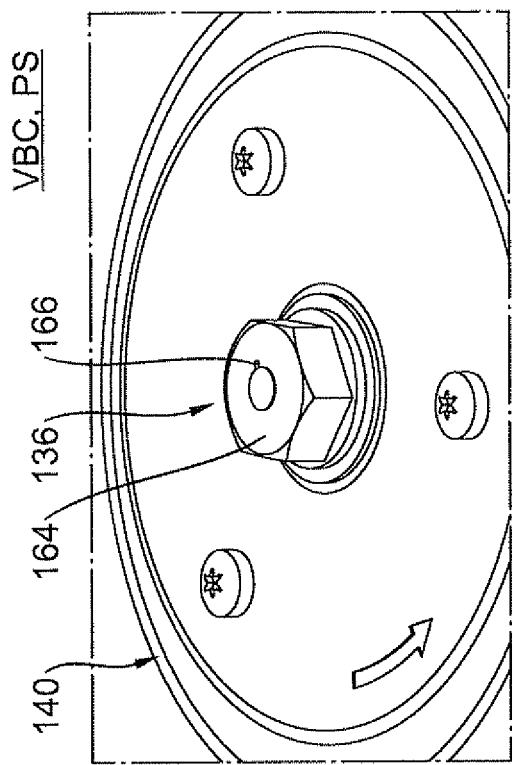
FIG. 3A is a partial perspective view of an external surface of the spring brake cylinder in one brake state.

FIG. 3A shows the external surface 140 of the spring brake cylinder 100 in the vehicle braking condition VBC that occurs when the running nut 122 and the brake spring chamber 112 of the brake release mechanism 110 is in a parking position PP. In such state of the brake actuator 200, the brake state indicator 120 is in a parking signaling condition PS. In the parking signaling condition PS, the indicator pin 134 is not visible from the outside of the release screw head 164, but is hidden inside the pin passage 166.

The release screw head 164 can be turned by engaging a suitable tool, e.g. a hex wrench, to the tool fitting 136 and applying a rotational motion.

In FIG. 38, the external surface 140 of the spring brake cylinder 100 is shown in the vehicle driving condition VDC that occurs when the running nut 122 of the brake release mechanism 110, and consequently the brake spring chamber 112, is in a driving position PD. In such state of the brake actuator 200, the brake state indicator 120 is in the driving signaling condition DS. In the driving signaling condition DS, the indicator pin 134 axially extends from the pin passage 166 to the outside, as visible here.

Figure 4:
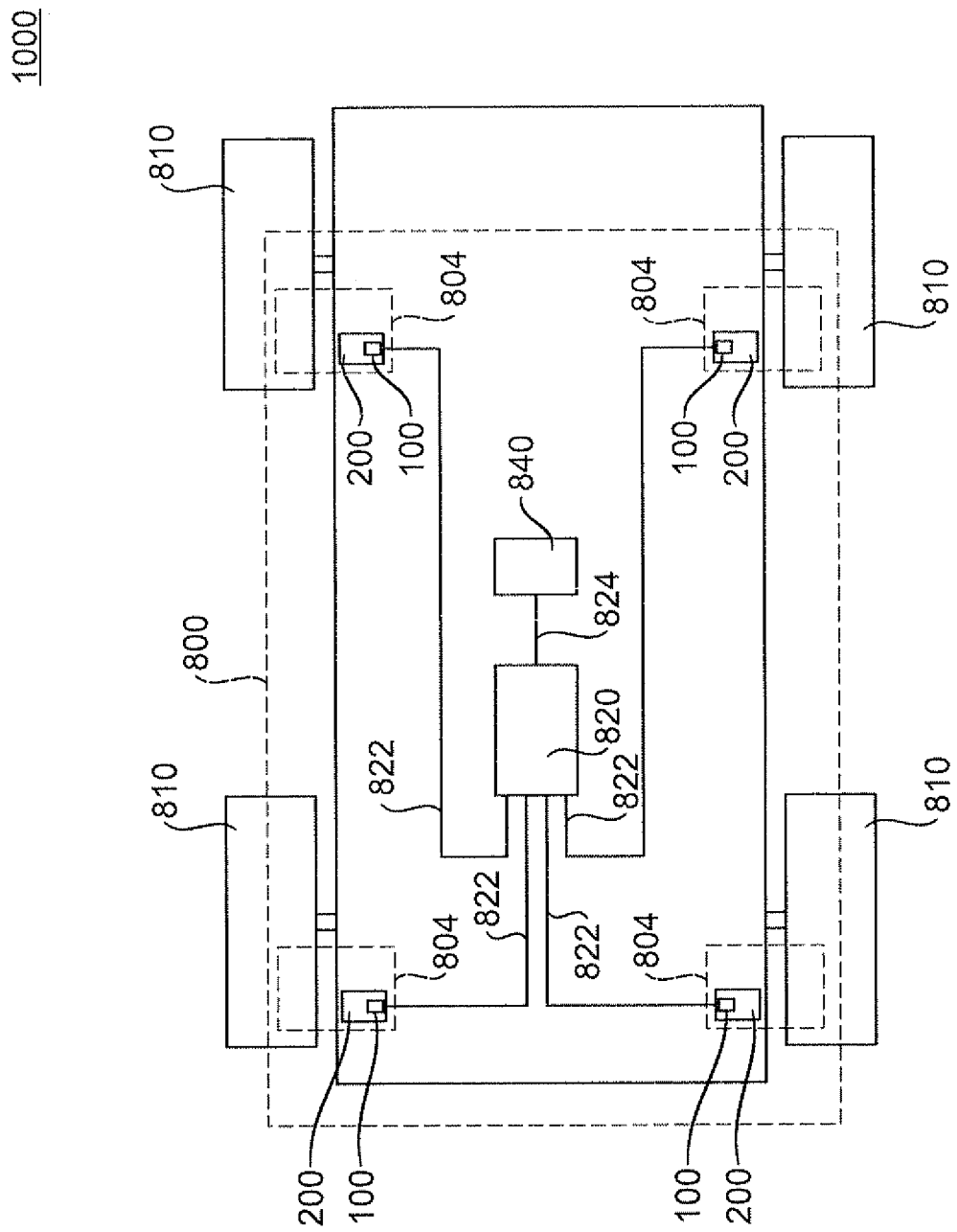
FIG. 4 is a schematic view of a motor vehicle with a brake system having four spring brake cylinders according to the concept of the invention.

FIG. 4 shows a motor vehicle 1000 with four wheels 810 and a brake system 800, wherein the brake system 800 includes for each wheel 810 a brake unit 804. Each brake unit 804 comprises a brake actuator 200 with a spring brake cylinder 100 according to the concept of the invention. Each brake actuator 200 is connected to a pressurized air supply 820 by way of an air supply line 822. The supply of pressurized air to each brake actuator 200 is individually controlled by an electronic control unit 840, which is connected to the pressurized air supply 820 by way of an electronic control line 824. To ensure an individual control of each brake actuator 200, the pressurized air, supply 820 and/or the brake system 800 includes one or more valves (not shown here).

The invention claimed is:

1. A spring brake cylinder (100), for a brake system (800) of a motor vehicle (1000), the spring brake cylinder comprising:
   a brake release mechanism (110), configured to axially contract a brake spring chamber (112), against a brake spring force, in a release direction (DR) from a parking position (PP) to a driving position (PD),
   wherein the brake release mechanism (110) comprises:
      a release screw (132) with an external thread (133), and
      a running nut (122), configured to act against the brake spring chamber (112), with an internal thread (123) movably engaged with the external thread (133), such that a rotational motion of the release screw (132) results in an axial nut movement (MN) of the running nut (122), and
   a brake state indicator (120), comprising a moveably arranged indicator pin (134), configured to indicate at an external surface (140) a brake state (BS),
   wherein the brake state indicator (120) comprises an actuation element (128), wherein the actuation element (128) is axially held in a force equilibrium (EF) between an actuation spring (124), exerting an actuation force (FA) on the actuation element (128), and a return spring (126), exerting a return force (FR) on the actuation element (128),
   wherein the actuation force (FA) is altered by the nut movement (MN) of the running nut (122) so as to shift the force equilibrium (FE), resulting in an axial element movement (ME) of the actuation element (128) of the brake state indicator (120),
   wherein the actuation element (128) is operatively coupled to the indicator pin (134) so as to transfer the element movement (ME) to the indicator pin (134), and
   wherein a pin passage (166) axially extends through at least a portion of the release screw (132), the pin passage extending through a release screw head (164) of the release screw (132), the pin passage (166) having a radial offset (RO) relative to a central axis of the release screw (132).

2. The spring brake cylinder (100) according to claim 1, wherein the indicator pin (134) is fixed to the actuation element (128).

3. The spring brake cylinder (100) according to claim 1, further comprising a bushing (130) arranged in a radial space between a cylinder lid (142) and the release screw (132).

4. The spring brake cylinder (100) according to claim 3, wherein the brake state indicator (120) is rotatable within the bushing (130).

5. The spring brake cylinder (100) according to claim 1, wherein the release screw (132) comprises an integrally attached tool fitting (136) accessible from an external surface (140) of the spring brake cylinder (100).

6. The spring brake cylinder (100) according to claim 1, wherein the indicator pin (134) is configured to be moved by the actuation element (128) from a hidden, parking signaling state (PS) when the brake spring chamber (112) is in a parking position (PP), to an extended, driving signaling state (DS) when the brake spring chamber (112) is in a driving position (PD).

7. A brake system (800) for a motor vehicle (1000) with at least one brake unit (804), wherein the at least one brake unit (804) comprises a brake actuator (200) with a spring brake cylinder (100) comprising:
   a brake release mechanism (110), configured to axially contract a brake spring chamber (112), against a brake spring force, in a release direction (DR) from a parking position (PP) to a driving position (PD),
   wherein the brake release mechanism (110) comprises:
      a release screw (132) with an external thread (133), and
      a running nut (122), configured to act against the brake spring chamber (112), with an internal thread (123) movably engaged with the external thread (133), such that a rotational motion of the release screw (132) results in an axial nut movement (MN) of the running nut (122), and
   a brake state indicator (120), comprising a moveably arranged indicator pin (134), configured to indicate at an external surface (140) a brake state (BS),
   wherein the brake state indicator (120) comprises an actuation element (128), wherein the actuation element (128) is axially held in a force equilibrium (EF) between an actuation spring (124), exerting an actuation force (FA) on the actuation element (128), and a return spring (126), exerting a return force (FR) on the actuation element (128),
   wherein the actuation force (FA) is altered by the nut movement (MN) of the running nut (122) so as to shift the force equilibrium (FE), resulting in an axial element movement (ME) of the actuation element (128) of the brake state indicator (120),
   wherein the actuation element (128) is operatively coupled to the indicator pin (134) so as to transfer the element movement (ME) to the indicator pin (134), and
   wherein a pin passage (166) axially extends through at least a portion of the release screw (132), the pin passage extending through a release screw head (164) of the release screw (132), the pin passage (166) having a radial offset (RO) relative to a central axis of the release screw (132).

8. A motor vehicle (1000) including a brake system (800) with a spring brake cylinder (100) comprising:
   a brake release mechanism (110), configured to axially contract a brake spring chamber (112), against a brake spring force, in a release direction (DR) from a parking position (PP) to a driving position (PD),
   wherein the brake release mechanism (110) comprises:
      a release screw (132) with an external thread (133), and a running nut (122), configured to act against the brake spring chamber (112), with an internal thread (123) movably engaged with the external thread (133), such that a rotational motion of the release screw (132) results in an axial nut movement (MN) of the running nut (122), and a brake state indicator (120), comprising a moveably arranged indicator pin (134), configured to indicate at an external surface (140) a brake state (BS), wherein the brake state indicator (120) comprises an actuation element (128), wherein the actuation element (128) is axially held in a force equilibrium (EF) between an actuation spring (124), exerting an actuation force (FA) on the actuation element (128), and a return spring (126), exerting a return force (FR) on the actuation element (128), wherein the actuation force (FA) is altered by the nut movement (MN) of the running nut (122) so as to shift the force equilibrium (FE), resulting in an axial element movement (ME) of the actuation element (128) of the brake state indicator (120), wherein the actuation element (128) is operatively coupled to the indicator pin (134) so as to transfer the element movement (ME) to the indicator pin (134), and wherein a pin passage (166) axially extends through at least a portion of the release screw (132), the pin passage extending through a release screw head (164) of the release screw (132), the pin passage (166) having a radial offset (RO) relative to a central axis of the release screw (132).

9. The brake system (800) according to claim 7, wherein the indicator pin (134) is fixed to the actuation element (128).

10. The brake system (800) according to claim 7, further comprising a bushing (130) arranged in a radial space between a cylinder lid (142) and the release screw (132).

11. The brake system (800) according to claim 10, wherein the brake state indicator (120) is rotatable within the bushing (130).

12. The brake system (800) according to claim 7, wherein the indicator pin (134) is configured to be moved by the actuation element (128) from a hidden, parking signaling state (PS) when the brake spring chamber (112) is in a parking position (PP), to an extended, driving signaling state (DS) when the brake spring chamber (112) is in a driving position (PD).

13. The motor vehicle (1000) according to claim 8, wherein the indicator pin (134) is fixed to the actuation element (128).

14. The motor vehicle (1000) according to claim 8, further comprising a bushing (130) arranged in a radial space between a cylinder lid (142) and the release screw (132).

15. The motor vehicle (1000) according to claim 14, wherein the brake state indicator (120) is rotatable within the bushing (130).

16. The motor vehicle (1000) according to claim 8, wherein the indicator pin (134) is configured to be moved by the actuation element (128) from a hidden, parking signaling state (PS) when the brake spring chamber (112) is in a parking position (PP), to an extended, driving signaling state (DS) when the brake spring chamber (112) is in a driving position (PD).

* * * * *